United States Patent [19]

Treanor

[11] 4,163,199
[45] Jul. 31, 1979

[54] THERMAL-RADIATION EXCITED VIBRATIONAL-EXCHANGE PUMPED LASER GENERATOR

[75] Inventor: Charles E. Treanor, Williamsville, N.Y.

[73] Assignee: Calspan Corporation, Buffalo, N.Y.

[21] Appl. No.: 812,033

[22] Filed: Jul. 1, 1977

[51] Int. Cl.² .............................................. H01S 3/091
[52] U.S. Cl. ............................ 331/94.5 G; 331/94.5 P
[58] Field of Search ..................... 331/94.5 G, 94.5 P, 331/94.5 PE; 330/4.3

[56] References Cited

U.S. PATENT DOCUMENTS

| | | | |
|---|---|---|---|
| 3,594,658 | 7/1971 | Cason et al. | 331/94.5 G |
| 3,614,663 | 10/1971 | Palanos | 331/94.5 P |
| 4,087,763 | 5/1978 | George et al. | 331/94.5 G |

*Primary Examiner*—William L. Sikes
*Attorney, Agent, or Firm*—Allen J. Jaffe; David J. Zobkiw

[57] ABSTRACT

Thermal radiation, or any incoherent radiation at the desired wavelengths, is converted into laser energy by using radiant absorption from a radiation source by a cold gas. The cold gas absorbs vibrational energy while remaining otherwise cold, and exchange of vibrational energy between molecules at this low temperature causes population inversions.

13 Claims, 4 Drawing Figures

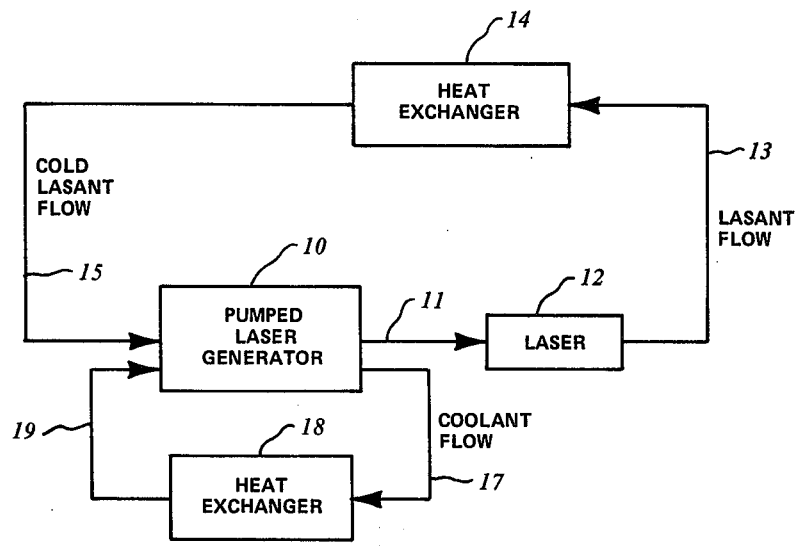

Fig. 1

| T (°K) | $R_\omega$ AT$\omega$ = 2100 cm$^{-1}$ | $R_\omega \Delta\omega$ FOR $\Delta\omega$ = 150 cm$^{-1}$ | $\mathcal{R}$ | $\dfrac{R_\omega \Delta\omega}{\mathcal{R}}$ |
|---|---|---|---|---|
| 1500 | 1.7 x 10$^{-3}$ $\dfrac{\text{watts}}{\text{cm}^2 \text{ ster cm}^{-1}}$ | 0.255 $\dfrac{\text{watts}}{\text{cm}^2 \text{ ster}}$ | 9.11 $\dfrac{\text{watts}}{\text{cm}^2 \text{ ster}}$ | 0.028 |
| 2000 | 3.12 x 10$^{-3}$ $\dfrac{\text{watts}}{\text{cm}^2 \text{ ster cm}^{-1}}$ | 0.468 $\dfrac{\text{watts}}{\text{cm}^2 \text{ ster}}$ | 28.8 $\dfrac{\text{watts}}{\text{cm}^2 \text{ ster}}$ | 0.016 |
| 2500 | 4.69 x 10$^{-3}$ $\dfrac{\text{watts}}{\text{cm}^2 \text{ ster cm}^{-1}}$ | 0.704 $\dfrac{\text{watts}}{\text{cm}^2 \text{ ster}}$ | 70.3 $\dfrac{\text{watts}}{\text{cm}^2 \text{ ster}}$ | 0.010 |

Fig. 3

| | P = 1 atm | | | | | P = 10 atm | | | | |
|---|---|---|---|---|---|---|---|---|---|---|
| t (sec) | $t/\tau_v$ | $t/\tau^*$ | $\phi/\phi^*$ | $\dfrac{\tau^*}{\tau_v}\dfrac{\phi}{\phi^*}$ | $\phi_T/\phi^*$ | $t/\tau_v$ | $t/\tau^*$ | $\phi/\phi^*$ | $\dfrac{\tau^*}{\tau_v}\dfrac{\phi}{\phi^*}$ | $\phi_T/\phi^*$ |
| 0.01 | 0.005 | 0.308 | 0.265 | 4.3 x 10$^{-3}$ | 0.7 x 10$^{-3}$ | 0.05 | 0.353 | 0.297 | 0.0420 | 0.010 |
| 0.02 | 0.01 | 0.616 | 0.460 | 7.4 x 10$^{-3}$ | 2.5 x 10$^{-3}$ | 0.1 | 0.706 | 0.507 | 0.0717 | 0.028 |
| 0.03 | 0.015 | 0.924 | 0.603 | 9.78 x 10$^{-3}$ | 5.2 x 10$^{-3}$ | 0.15 | 1.060 | 0.653 | 0.092 | 0.058 |
| 0.04 | 0.02 | 1.232 | 0.708 | 0.0114 | 8.6 x 10$^{-3}$ | 0.2 | 1.413 | 0.756 | 0.107 | 0.093 |
| 0.05 | 0.025 | 1.540 | 0.785 | 0.0127 | 0.0124 | 0.25 | 1.766 | 0.829 | 0.117 | 0.132 |
| 0.06 | 0.03 | 1.848 | 0.842 | 0.0136 | 0.0164 | 0.3 | 2.120 | 0.880 | 0.124 | 0.175 |
| 0.07 | 0.035 | 2.156 | 0.884 | 0.0143 | 0.0207 | 0.35 | 2.473 | 0.916 | 0.130 | 0.220 |
| 0.08 | 0.04 | 2.46 | 0.914 | 0.0148 | 0.0252 | 0.4 | 2.826 | 0.941 | 0.133 | 0.266 |
| 0.09 | 0.045 | 2.772 | 0.937 | 0.0152 | 0.0298 | 0.45 | 3.18 | 0.958 | 0.135 | 0.314 |
| 0.10 | 0.05 | 3.081 | 0.954 | 0.0155 | 0.0345 | 0.5 | 3.53 | 0.971 | 0.137 | 0.362 |
| 0.50 | 0.25 | 15.40 | 1.0 | 0.01623 | 0.2337 | 2.5 | 17.6 | 1.0 | 0.141 | 2.35 |
| 1.0 | 0.5 | 30.80 | 1.0 | 0.01623 | 0.4837 | 5.0 | 35.3 | 1.0 | 0.141 | 4.85 |

Fig. 4

THERMAL-RADIATION EXCITED VIBRATIONAL-EXCHANGE PUMPED LASER GENERATOR

In conventional optically pumped lasers, either laser radiation or flash-lamp radiation is used to produce the population inversion in the laser to be pumped. These schemes require very bright light sources, and are inefficient. The use of thermal energy as a pumping source has been attempted for a $CO_2$ laser, but very low gains have been obtained. (See References 1-7).

It is an object of this invention to provide a method and apparatus for pumping a laser by the use of energy from a radiation source.

It is an additional object of this invention to provide a method and apparatus for vibration-vibration pumping a gas using an incoherent radiation source.

It is an additional object of this invention to provide a method and apparatus for continuously converting energy from a radiation source to laser energy.

It is a further object of this invention to provide a tuneable laser. These objects, and others as will become apparent hereinafter, are accomplished by the present invention.

Basically, cold CO is passed through a tube which is transparent to those wavelengths that are absorbed by vibrational transitions in the spectral regions near the fundamental ($4.7\mu$). The tube is surrounded by an oven which supplies radiation at these wavelengths. The tube is vacuum insulated from the oven, and is reflective to wavelengths that are absorbed appreciably by the tube. Thus the tube has little tendency to heat up, and is cooled to compensate for any such undesirable heating. The CO then emerges from the tube cold, but vibrationally excited. Vibrational exchange soon causes an inversion in the CO (see References 8 and 9), and it can be used as the working fluid in a CO laser. The absorption lines of the CO can be broadened by a high pressure of diluent (such as argon) in order to increase the net absorption of radiation. This line broadening will also permit tuning of the laser output over a range of wavelengths.

BRIEF DESCRIPTION OF THE DRAWINGS

For a fuller understanding of the present invention, reference should now be had to the following detailed description thereof taken in conjunction with the accompanying drawings wherein:

FIG. 1 is a schematic diagram of the apparatus;
FIG. 3 is a table of the calculation for $R_\omega \Delta\omega$;
and
FIG. 4 is a tabulation of the degree of vibrational excitation of the gas at various times after entering the device.

DESCRIPTION OF THE PREFERRED EMBODIMENT

Figure 2:
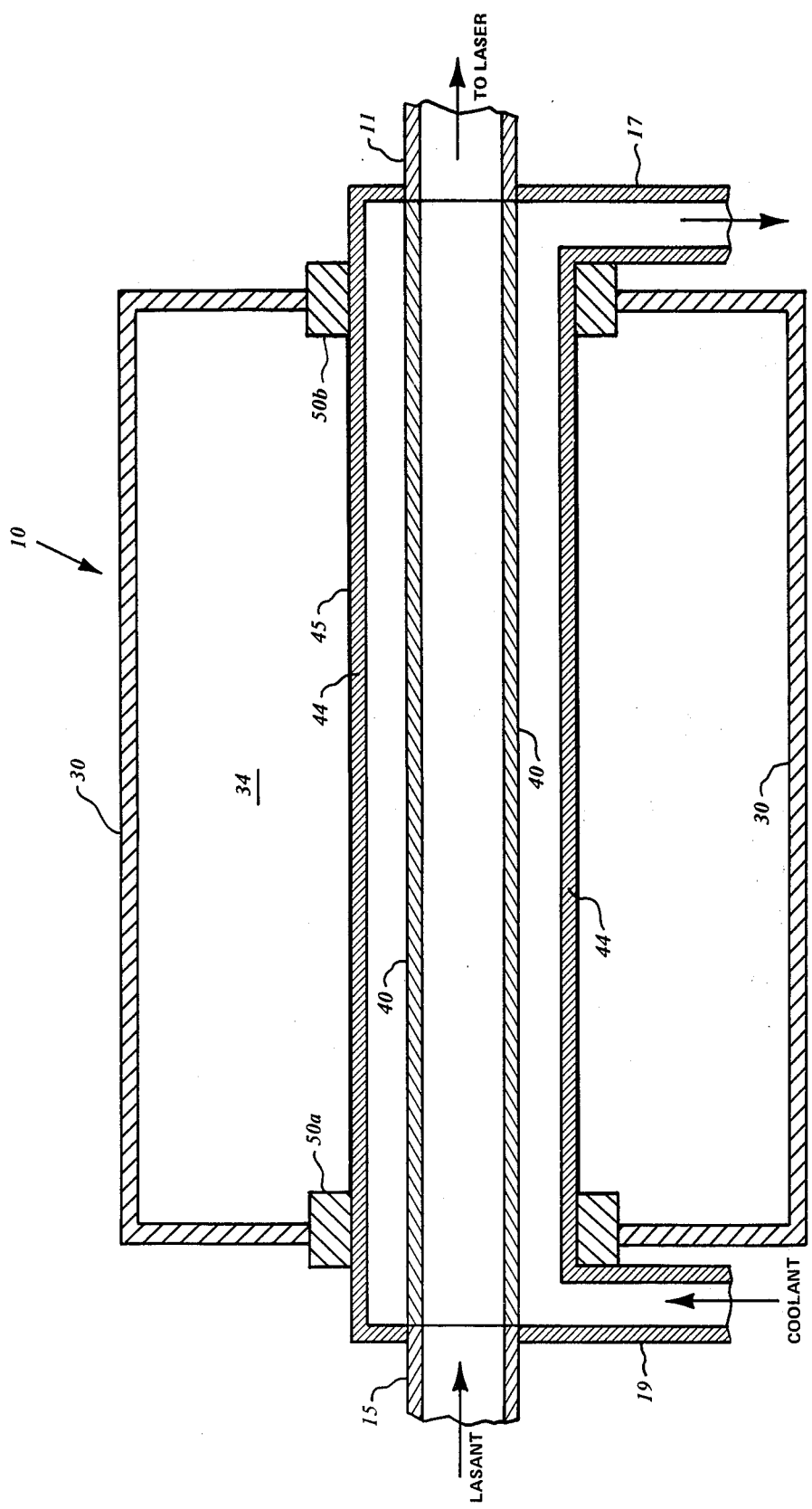
FIG. 2 is a sectional view of a thermal-energy pump for laser-gas excitation.

In FIG. 1, the numeral 10 generally designates a pumped laser generator. The pumped laser generator 10 is in a closed loop fluid circuit serially including line 11, laser 12, line 13, heat exchanger 14 and line 15. The pumped laser generator 10 is in a second closed loop fluid circuit serially including line 17, heat exchanger 18 and line 19. As best shown in FIG. 2, the pumped laser generator 10 includes an annular thermal energy source or oven 30 which is vacuum separated from cooling jacket 44 in order to reduce heat transfer to the tube 40. Cooling jacket 44 and tube 40 are transparent to those wavelengths that are absorbed by vibrational transitions in the laser gas used and the surface of cooling jacket 44 is surface treated by interference coating 45 which reflects those wavelengths that would be absorbed by cooling jacket 44 and tube 40. Cooling jacket 44 is connected via lines 17 and 19 with heat exchanger 18 and is separated from thermal energy source or oven 30 by heat and vacuum seals 50a and 50b which serve to keep the vacuum in the annular volume between the thermal energy source 30 and cooling jacket 44.

OPERATION

Initially, annular vacuum chamber 34, defined by thermal energy source 30 and cooling jacket 44, is evacuated, coolant is caused to flow into cooling jacket 44 from line 19 and is returned to heat exchanger 18 via line 17 and thermal energy source or oven 30 is activated. When conditions have stabilized, the laser gas, CO, is caused to flow from line 15, through tube 40, and via line 11 to the laser cavity of laser 12 thence via line 13, heat exchanger 14 and line 15 back to tube 40. The external surface of the cooling jacket 44 is irradiated with blackbody radiation by thermal energy source or oven 30. Radiation in the wavelength of interest is transmitted through interference coating 45 and cooling jacket 44 to the CO passing through tube 40. The equations for the radiation in a blackbody enclosure are:

$$R_\omega = C_{1\omega}\omega^3 \frac{1}{e^{\omega/kT} - 1} \quad (1)$$

where
$C_{1\omega} = 1.1906 \times 10^{-12}$ (watts/cm$^2$ ster. cm$^{-1}$), a radiation constant,
$k = 0.695$ cm$^{-1}$ °K.$^{-1}$, the Boltzmann constant
$\omega$ is the wavenumber ($1/\lambda$) of the radiation measured in cm$^{-1}$, and T is the temperature of the oven wall, measured in °K.
$R_\omega \Delta\Omega \Delta\omega$ is the power radiated by the wall through a small solid angle of $\Delta\Omega$ sterradians, normal to the wall, in a wavenumber interval $\Delta\omega$ cm$^{-1}$. The corresponding radiation emitted over the entire spectrum is $$R = \int_0^\infty R_\omega d\omega - \frac{\sigma}{\pi} T^4 \quad (2)$$

where $\sigma/\pi = 1.8 \times 10^{-12}$ watts/cm$^2$ °K.$^4$ ster.

Equations (1) which gives the power striking cooling jacket 44 in the normal direction per cm$^2$, per unit solid angle, per unit wavenumber and (2) which gives the power at all wavenumbers striking cooling jacket 44 in the normal direction, per cm$^2$, per unit solid angle can also be used to calculate the energy incident on a surface within the oven cavity.

A table of the calculations for the power density available for absorption in the spectral region of absorption for an isotopic mixture of CO at 100° K. for a 150 cm$^{-1}$ band near 2100 cm$^{-1}$ at 1500° K., 2000° K. and 2500° K. is presented in FIG. 3. As will be discussed later, $\Delta\omega = 150$ cm$^{-1}$ is taken as a reasonable bandwidth for CO absorption.

From the equations given above and from FIG. 3, it is seen that at 2000° K., only 1.6% of the radiation is in the bandwidth of interest (assuming a 150 cm$^{-1}$ bandwidth) and the rest must be either reflected or transmitted, or else it will become an inefficient loss. The losses are taken by cooling jacket 44, which is cooled by a coolant at a temperature near the operating temperature of the CO, to reduce the heat transfer to tube 40 (and thence to the cold CO) to negligible proportions. The reflective interference coating 45 gives a strong wavelength dependence to the transmitted light. The cold CO passing through the tube 40 absorbs vibrational energy while remaining otherwise cold, and exchange of vibrational energy between molecules at this low temperature (from 300°–100° K., depending on maximum efficiency) causes population inversions. The CO moves sufficiently rapidly so that relatively little vibrational energy is lost to translational motion. Thus, the CO emerges from tube 40 cold, but vibrationally excited. Vibrational exchange soon causes an inversion in the CO (as described in references 8 and 9) and it can be used as the working fluid in laser 12.

An evaluation of the time history of the quantum content of a gas that is introduced into the oven radiative atmosphere would be as follows:
let
$\phi$ = average number of quanta/molecule
$\phi_{eq}$ = average number of quanta/molecule in total thermodynamic equilibrium.

In a simple-harmonic-oscillator approximation of the molecule (which is appropriate in this application), the average number of quanta contained by a single molecule is given by $$\phi = (e^{\omega_0/kT_v} - 1)^{-1} \text{ (quanta/molecule)} \qquad (3)$$

where
$\omega_o$ is the characteristic wavenumber of the molecule (for CO, $\omega_o = 2140$ cm$^{-1}$, $\omega_o/k = 3080°$ K.) and $T_v$ is the vibrational temperature associated with this degree of vibrational excitation. The rate of change of quanta/molecule is given by $d\phi/dt$ = optical absorption rate − optical emission
rate − (V−T) relaxation
rate = $(\phi_{eq}/\tau) - (\phi/\tau) - (\phi/\tau_v)$ (4)

where
$\tau$ = optical lifetime
$\tau_v$ = V−T relaxation time = $(p\tau_v)/p$
p = pressure in atmospheres
$p\tau_v$ = known function of temperature independent of pressure
$\phi_{eq}$ = equilibrium value of $\phi$, determined by putting $T_v = T$ in equation (3)

Let $\phi^* \equiv \phi_{eq} \dfrac{\tau_v}{\tau_v + \tau}$ $\dfrac{1}{\tau^*} = \dfrac{1}{\tau} + \dfrac{1}{\tau_v}$ or $\dfrac{\tau}{\tau^*} = 1 + \dfrac{\tau}{\tau_v}$ then $\phi^* = \dfrac{\tau^*}{\tau} \phi_{eq}$ and $\dfrac{d\phi}{dt} = \dfrac{\phi^*}{\tau^*} - \dfrac{\phi}{\tau^*}$ ; $\dfrac{d(\phi - \phi^*)}{dt} = -\dfrac{\phi - \phi^*}{\tau^*}$ At $t = 0$, $\phi = 0$. At time t, the result for the average number of quanta per molecule is $$\phi = \phi^*(1 - e^{-t/\tau^*}) \qquad (5)$$

where $\phi^*$ is a quasiequilibrium value of $\phi$ (less than the true equilibrium value $\phi_{eq}$ because of the constant vibration to translation relaxation), and $\tau^*$ is the relaxation time defined by $$\dfrac{1}{\tau^*} = \dfrac{1}{\tau} + \dfrac{1}{\tau_v} \qquad (6)$$

These equations can be generalized to include a diluent gas or a "storage" gas.

If the average number of photons/molecule lost to translation through T−V is defined as $\phi_T$ then $\dfrac{d\phi_T}{dt} = \dfrac{\phi}{\tau_v} = \dfrac{1}{\tau_v} \phi^*(1 - e^{-t/\tau^*})$ $\phi_T = \dfrac{\phi^*}{\tau_v} [t + \tau^* e^{-t/\tau^*}]_0^t$ (7)

At $t = 0$, $\phi_T = 0$. At later times $\phi_T = \phi^* \dfrac{t}{\tau_v} - \phi \dfrac{\tau^*}{\tau_v}$ (8)

$= \phi^* \left( \dfrac{t}{\tau_v} - \dfrac{\tau^*}{\tau_v} \dfrac{\phi}{\phi^*} \right)$ From equation (5) we see that, in order to make $\phi$ as close to $\phi^*$ as possible, we wish to have $t > \tau^*$, perhaps $t = N\tau^*$ where N = 3 or 4, so that $\phi \approx \phi^*$. Under these conditions equation (8) shows that $\phi_T \simeq \phi^* \left( \dfrac{N\tau^*}{\tau_v} - \dfrac{\tau^*}{\tau_v} \right) = \phi^* \dfrac{\tau^*}{\tau_v} (N - 1)$ $= \phi^*(N - 1) \dfrac{\tau}{\tau_v} \left( \dfrac{1}{1 + \dfrac{\tau}{\tau_v}} \right)$ and $\phi^* = \phi_{eq} \left( \dfrac{1}{1 + \dfrac{\tau}{\tau_v}} \right)$ From these equations it can be seen that in order to keep $\phi_T$ small and $\phi^*$ large, $\tau/\tau_v$ should be kept small. For CO, $\tau/\tau_v = 0.017$ at one atmosphere pressure, and proportionately higher at higher pressure. This gives $\phi^*/\phi_{eq} = 0.98$ at one atmosphere, and 0.858 at 10 atmospheres. The use of a mixture of CO with N$_2$ as a "storage" diluent results in an increase in the effective radiative lifetime $\tau$, and thus an increase in $\tau/\tau_v$. This effect is undesirable in the present context, but the increase in $\tau$ is equivalent to a decrease in K (discussed later) and therefore permits use of a larger diameter tube 40, which may be desirable. Values of $\phi_T/\phi^*$, the loss of heat to translation, are shown in FIG. 4 as a function of t for two values of the pressure. A value of $p\tau_v = 2$ atm. sec. was used in the calculation, and this is a conservative number. Any increase in this number would permit a correspondingly higher pressure, or a longer residence time in the oven.

The vibrational and rotational/translational temperatures of the gas emerging from oven 30 at a time t (having entered oven 30 at t=0) can be evaluated from the results shown in FIG. 4. For CO at one atmosphere, T = 300° K., $\tau = 0.033$ sec and $\tau_v = 2$ sec, it can be seen that in 0.1 seconds, $\phi$ reaches 0.954 of $\phi^*$, which in turn is 0.984 of the total-equilibrium value $\phi_{eq}$. Then, if the equilibrium temperature in the oven is 2000° K., and using $\omega/k = 3083°$ K. for CO, $\phi_{eq}$ is 0.272 quanta/ molecule, as given by equation (3). $\phi$ is $0.954 \times 0.984 \times 0.272 = 0.256$ quanta/molecule, corresponding to a vibrational temperature of 1937° K. The quanta/molecule lost to translation are 0.0345 of $\phi^*$, or $0.0345 \times 0.984 \times 0.272 = 0.00923$ quanta/molecule. If this energy is distributed among the 5 translational and rotational degrees of freedom it would result in a temperature change $\Delta T$, where $$0.00923\omega = (5/2)k\Delta T$$

or $\Delta T = 11°$ K. Even at 10 atmospheres, $T = 300°$ K., $\tau = 0.033$ sec and $\tau_v = 0.2$ sec, where $T_v(0.10) = 1825°$ K. and $\Delta T = 0.363(0.2336)(3083)(2/5) = 105°$ K., operation is still attractive. Use of argon diluent would decrease the temperature change.

The length, L, of the tube 40 is determined by the time the gas spends in oven 30. For pure CO at atmospheric pressure a typical time is 0.1 seconds. This gives considerable latitude in length and velocity, depending on the desired output power.

An evaluation of an appropriate diameter for tube 40 can be obtained as follows: When light passes thru the absorbing gas it decreases in intensity, and after it has traversed a distance l, its intensity has reduced to a value I, given by $$I = I_o e^{-K(n/n_o)l} \qquad (9)$$

where
$I_o$ = intensity of the light upon entering the gas
$n$ = number density of absorbing molecules
$n_o$ = number density of absorbing molecules at standard temperature and pressure
$K$ = absorption coefficient of the gas A criterion for a reasonable diameter might be that the intensity has reduced to $e^{-1}$ of its initial value by the time it has reached the center of the tube. This would imply a diameter given by $$D = 2/K(n/n_o) \qquad (10)$$

For CO it is known that $$\int \overline{K} = \frac{250}{\Delta \omega} \text{ cm}^{-1} \text{ atm}^{-1} \qquad (11)$$

where $\Delta\omega$ = wavenumber interval over which appreciable absorption occurs, so that an average value of $\overline{K}$ for use in equation (10) can be obtained from $$\int_{\Delta\omega} K \, d\omega = 250 \text{ cm}^{-2} \text{ atm}^{-1}$$

It is desirable that D be large to minimize wall effects. High pressure tends to broaden the spectral lines thus reducing their maximum K values ($K_{max} \approx 1/\sqrt{p}$). CO may be satisfactorily line broadened through the use of argon, and this can be further enhanced by using isotopes of carbon and oxygen. Including $^{12}C\ ^{18}O$, $^{13}C\ ^{18}O$ and $^{13}C\ ^{16}O$ with the common $^{12}C\ ^{16}O$ improves the breath of absorption further. Operation at 1 atmosphere of CO partial pressure, assuming a bandwidth of 150 cm$^{-1}$ (for CO at 100° K. and with an isotope mixture), gives a $\overline{K} = 1.7$ cm$^{-1}$, or from equation (10), $D = 2/K = 1$ cm. If the device is operated at a translational temperature of 300° K., the bandwith is about 300 cm$^{-1}$ and the optimum diameter is doubled. It is important to point out that these conditions will be further relaxed by the increased absorption bandwith resulting from vibration-vibration pumping. The substitution of $N_2$ for some of the CO permits storage of vibrational energy in the $N_2$ (by vibrational exchange from the CO) but with a lower value of $n/n_o$, and thus a larger value of D. Thus the optimum diameter of the tube 40 may be several centimeters or more.

The above described device is a basic generator since it converts thermal energy to laser energy. It can be run in a closed cycle, where inefficiencies in the vibrational exchange pumping, which cause heating of the CO, are compensated by refrigeration before returning to the oven. Since the CO is not broken down as in electrical discharge devices, this approach is applicable to a large variety of gases.

Although the preferred embodiment of the present invention has been illustrated and described, other changes will occur to those skilled in the art. For example, the source of incoherent radiation may be an oven, a flame, a gaseous discharge, the sun, or any other source of radiation which contains the correct wavelengths for absorption by the lasant gas. Also, the vacuum may be eliminated and room air may be used for cooling. The use of a pressurized cooling gas may be used to minimize pressure differentials across the tubes to thereby permit the use of thinner tubes. It is therefore intended that the scope of the present invention is to be limited only by the scope of the appended claims.

REFERENCES

1. Bokhan, P. A. and Talankina, G. I., On the Possibility of Optical Pumping of Gases by Their Own Radiation. UDC 621.375.9:535.
2. Aleksandrov, V. I., Kuznetsov, A. E., and Ulyakov, P. I., Threshold Conditions for Laser Pumping with Blackbody Radiation. Zh. Prik. Spektroskopii 8, 723-730 (1968).
3. Basov, N. G. and Letokhov, V. S., Two-Level Gas Laser with Coherent Optical Pumping. ZhETF Pis. Red. 9, No. 12, 660-663 (June 20, 1969).
4. Fein, M. E., Verdeyen, J. T., and Cherrington, B. E., A Thermally Pumped CO$_2$ Laser. Appl. Phys. Letters, Vol. 14, No. 11, June 1, 1969.
5. Eletskii, A. V., Efremenkova, L. Ya., and Smirnov, B. M., Optically Pumped Carbon Dioxide Laser. Sov. Phys.-Dokl., Vol. 15, No. 9, 843 (1971).
6. Wieder, I., Flame-Pumped Lasers, 2nd Conference on Chemical and Molecular Lasers, 48-49 (May 22-24, 1969).
7. Shirahata, H., Kawada, S., and Fujioka, T., Atmospheric Pressure CW CO$_2$ Laser Pumped by Blackbody Radiation, 5th Conference on Chemical and Molecular Lasers, 29 (Apr. 18, 19 & 20, 1977).
8. Treanor, C. E, Rich, J. W. and Rehm, R. G., Vibrational Relaxation of Anharmonic Oscillators with Exchange-Dominated Collisions, J. Chem. Phys., 48, 1798 (1968).
9. Rich, J. W., Thompson, H. M., Treanor, C. E., and Daiber, J. W., An Electrically Excited Gas-Dynamic Carbon Monoxide Laser, Appl. Phys. Letters, 19, 230 (1971).

I claim:
1. A method for optically pumping a laser from an incoherent radiation source including the steps of:
   passing a lasant gas through a laser generator;

supplying incoherent radiation containing the correct wavelengths for absorption by the lasant gas into the laser generator;

filtering the incoherent radiation supplied into the laser generator to reject wavelengths unsuitable for vibrational absorption whereby only correct wavelengths reach the lasant gas which is then excited by vibration-vibration exchange while remaining otherwise cool; and passing the excited lasant gas to a laser cavity where the excited lasant gas relaxes to produce lasing.

2. The method of claim 1 wherein the lasant gas includes carbon monoxide.

3. The method of claim 1 wherein the relaxed lasant gas is recycled to the laser generator.

4. The method of claim 1 wherein the lasant gas is pressure broadened to expand the correct wavelengths for absorption and to provide tunability.

5. Apparatus for changing incoherent radiation into coherent radiation including:

annular laser generator means for supplying incoherent radiation including desired wavelengths;

a source of lasant;

optically transparent lasant supply means connected to said source of lasant and axially passing through said laser generator means;

filtering means located in said laser generator means for rejecting wavelengths unsuitable for vibrational absorption, whereby only correct wavelengths reach the lasant which is then excited by vibration-vibration exchange while remaining otherwise cool; and laser cavity means connected to said optically transparent supply means for receiving the excited lasant which relaxes to produce lasing.

6. The apparatus of claim 5 further including means for recycling the relaxed lasant.

7. The apparatus of claim 5 wherein said gas includes carbon monoxide.

8. The apparatus of claim 5 further including an optically transparent cooling jacket surrounding said optically transparent supply means.

9. The apparatus of claim 8 wherein said filtering means is an interference coating on said cooling jacket.

10. The apparatus of claim 5 wherein said lasant includes a diluent at high pressure to pressure broaden the correct wavelengths, to limit temperature increases in the lasant and to provide tunability.

11. The apparatus of claim 5 wherein a vacuum separates said annular laser generator means from said optically transparent lasant supply means.

12. The apparatus of claim 5 wherein said lasant is a mixture including a laser gas diluted with a non-radiating gas that is resonant with the laser gas and which will store vibrational energy without increasing the absorption rate.

13. The apparatus of claim 5 wherein said laser gas is carbon monoxide and said non-radiating gas is nitrogen.

* * * * *